(12) United States Patent
Bartscher et al.

(10) Patent No.: US 12,297,975 B2
(45) Date of Patent: May 13, 2025

(54) METHOD FOR OPERATING A LIGHTING APPARATUS OF A MOTOR VEHICLE

(71) Applicant: HELLA GmbH & Co. KGaA, Lippstadt (DE)

(72) Inventors: Sebastian Bartscher, Hamm (DE); Florian Herold, Bielefeld (DE); Ingo Moellers, Rietberg (DE); Martin Pluempe, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/666,421

(22) Filed: May 16, 2024

(65) Prior Publication Data

US 2024/0302021 A1    Sep. 12, 2024

Related U.S. Application Data

(63) Continuation of application No. PCT/EP2022/081035, filed on Nov. 8, 2022.

(30) Foreign Application Priority Data

Nov. 16, 2021    (DE) ............ 10 2021 129 815.6

(51) Int. Cl.
 *H05B 45/18*    (2020.01)
 *B60Q 1/14*    (2006.01)
 (Continued)

(52) U.S. Cl.
 CPC ............ *F21S 45/40* (2018.01); *B60Q 1/1407* (2013.01); *F21S 41/153* (2018.01); *F21S 41/65* (2018.01); *H05B 45/18* (2020.01)

(58) Field of Classification Search
 CPC ........ H05B 45/18; H05B 45/28; H05B 45/46; F21S 45/40; B60Q 1/1407; B60Q 1/1415; B60Q 1/1423
 See application file for complete search history.

(56) References Cited

U.S. PATENT DOCUMENTS

| | | |
|---|---|---|
| 10,237,940 B2 | 3/2019 | Pelz et al. |
| 10,820,390 B2 | 10/2020 | Baumheinrich et al. |

(Continued)

FOREIGN PATENT DOCUMENTS

| | | |
|---|---|---|
| DE | 102017131229 A1 | 6/2018 |
| DE | 102017105131 A1 | 9/2018 |

(Continued)

*Primary Examiner* — Sean P Gramling
(74) *Attorney, Agent, or Firm* — Muncy, Geissler, Olds & Lowe, P.C.

(57) ABSTRACT

A method for operating a lighting apparatus of a vehicle. A temperature of the light source is recorded while the first light distribution is generated, a temperature change of the light source which is expected to emerge during the transition from the first to the second light distribution is calculated. Should the calculation predict that the transition from the first to the second light distribution would rise to an excessive temperature leading to a temperature above a threshold value in at least one critical region, then the power of at least one of the semiconductor elements is reduced during the control of the semiconductor elements implemented for generating the second light distribution, such that the temperature in the at least one critical region of the light source is not expected to exceed the specified threshold value as a result of the transition from the first to the second light distribution.

18 Claims, 1 Drawing Sheet

(51) Int. Cl.
*F21S 41/153* (2018.01)
*F21S 41/65* (2018.01)
*F21S 45/40* (2018.01)

(56) References Cited

U.S. PATENT DOCUMENTS

2018/0184495 A1* 6/2018 Pelz ..................... B60Q 11/00
2022/0232678 A1   7/2022 Karray et al.

FOREIGN PATENT DOCUMENTS

EP       3118279 A1    1/2017
WO    WO2020239875 A1   12/2020

* cited by examiner

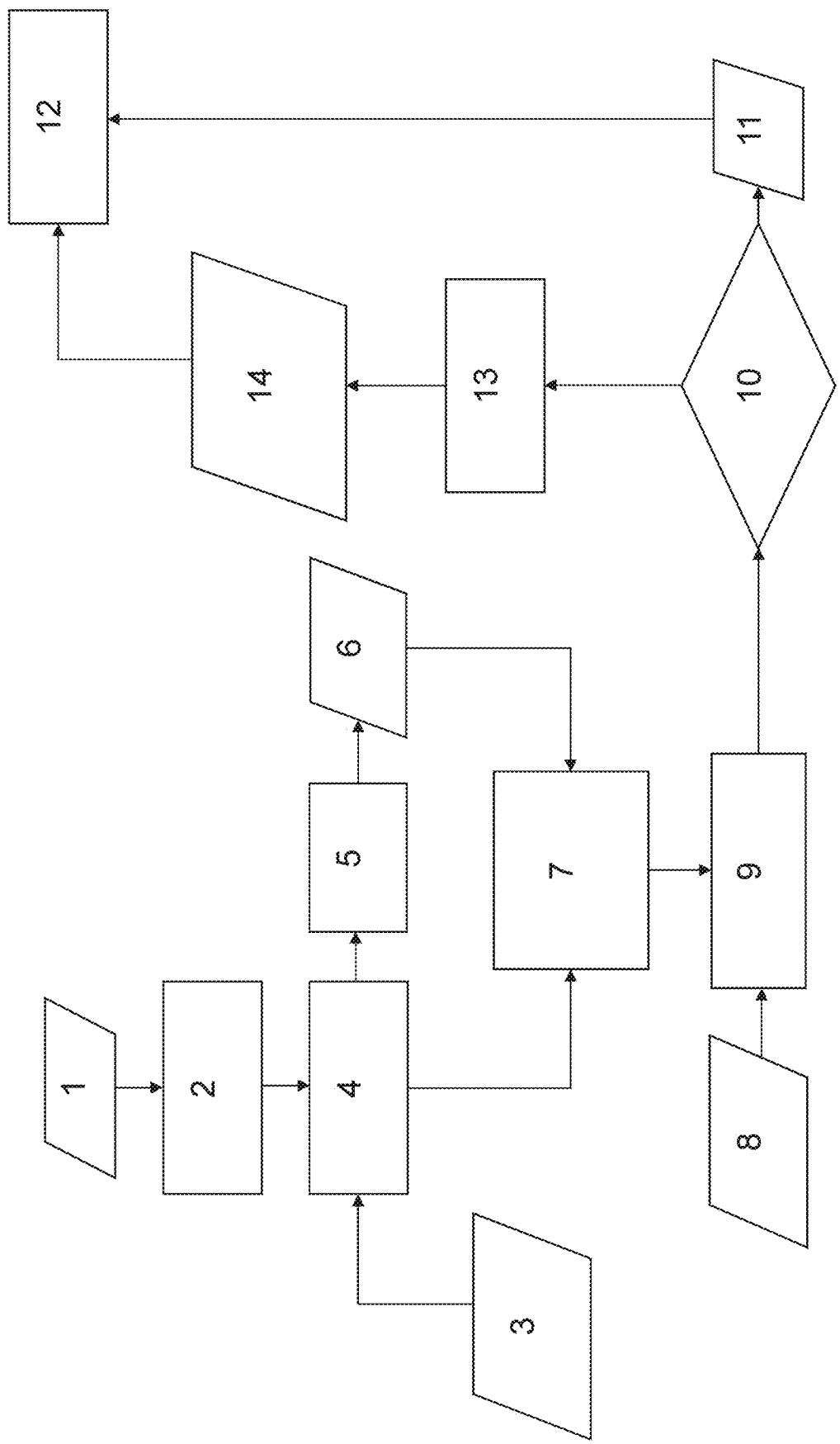

METHOD FOR OPERATING A LIGHTING APPARATUS OF A MOTOR VEHICLE

This nonprovisional application is a continuation of International Application No. PCT/EP2022/081035, which was filed on Nov. 8, 2022, and which claims priority to German Patent Application No. 10 2021 129 815.6, which was filed in Germany on Nov. 16, 2021, and which are both herein incorporated by reference.

BACKGROUND OF THE INVENTION

Field of the Invention

The present invention relates to a method for operating a lighting apparatus of a motor vehicle and a lighting apparatus for a motor vehicle.

Description of the Background Art

A method and a lighting apparatus are known from WO 2020/239875 A1, which corresponds to US 2022/0232678. The lighting apparatus described therein is designed as a high-resolution headlamp of a motor vehicle comprising a light source having at least 2,000 semiconductor elements arranged in the style of a matrix. A large number of sensors are provided which, in addition to the temperature of the light source, measure the ambient temperature, the temperature of a target to be reached, the ambient humidity, the intensity of the light hitting the headlamp from outside and the illumination of the road to be travelled. On the basis of the determined data, a temperature development of the light source, for example, in the next 10 to 30 minutes is calculated in advance. Depending on the predicted temperature development, cooling measures such as lowering the performance of the semiconductor elements or activating fans can be carried out.

Light sources with semiconductor elements arranged in the style of a matrix for the targeted generation of pixels of a light distribution, such as a solid-state LED array or an SSL HD LED, exhibit a higher self-heating rate as compared to conventional light emitting diodes. Due to the increased rise in temperature within the array, the junction temperature of the light emitting diodes becomes the relevant threshold temperature of the system. The junction temperature must be kept below the specified threshold temperature, for example for warranty reasons. At the same time, the light emitting diodes in such light sources have a very small thermal time constant. This leads to a rapid change in the junction temperature when there is a change in the light pattern sent to the light emitting diodes to switch to a different light distribution. If the junction temperature is close to the limit temperature and a light pattern is sent to the light emitting diodes, which requires a higher power, for example, the temperature of the light source rises sharply and can significantly exceed the limit temperature before a conventional control system, such as that known from WO 2020/239875 A1, can intervene. So there is a risk that the semiconductor elements are operated beyond their specifications.

SUMMARY OF THE INVENTION

It is therefore an object of the present invention to provide a method and a production of a lighting apparatus, which reduces the risk of the semiconductor elements being operated outside of their specifications.

This is achieved according to an example of the invention by a method in which a temperature of the light source is recorded while the first light distribution is generated. A temperature change of the light source which is expected to emerge during the transition from the first to the second light distribution is calculated. Should the calculation predict that the transition from the first light distribution to the second light distribution would give rise to an excessive temperature leading to a temperature above a specified threshold value in at least one critical area of the light source, then the power of at least one of the semiconductor elements is reduced during the control of the semiconductor elements implemented for the purpose of generating the second light distribution, in such a way that the temperature in the at least one critical region of the light source is not expected to exceed the specified threshold value as a result of the transition from the first to the second light distribution.

In this way, it is possible to prevent the temperature in a critical area of the light source from rising above the specified threshold value when changing from one light distribution to another light distribution. As a result, the limits of the system can be approached more precisely and quickly in the thermal limit area. Ideally, this allows for the optimal light performance of the system to be exploited.

It may be provided that the at least one critical area whose temperature should not rise above the specified threshold value is the junction region of at least one of the semiconductor elements. Furthermore, the measured temperature of the light source can be a temperature at or in the junction region of at least one of the semiconductor elements. The temperature threshold in at the least one critical region of the light source can be, in particular, between 140° C. and 160° C., in particular between 145° C. and 155° C., preferably around 150° C.

It is possible that in order to calculate the temperature change in the transition from the first to the second light distribution, an algorithm is used which calculates a temperature difference between two regions of the at least one semiconductor element, in particular a temperature difference between the solder joint and the junction region of the at least one semiconductor element. Due to the current flowing through the area of the solder joint, an increase in temperature in this area of the semiconductor element can be predicted comparatively reliably, as a function of the planned control of the semiconductor element.

It may be provided that the calculation of the temperature difference is carried out by estimating the thermal resistance of the at least one semiconductor element as a function of the light distribution to be generated. In this case, the thermal resistance can be calculated by a formula of the type:

$$R_{th} = c_1 \cdot p_1 + c_2 \cdot p_2 + c_3 \cdot p_3 \ldots + b$$

wherein $c_1$, $c_2$, $c_3$, . . . as well as b are experimentally determined coefficients and wherein $p_1$, $p_2$, $p_3$, . . . are parameters that are calculated when the lighting apparatus is operated, in particular when the first light distribution is produced.

In particular, the coefficients can be determined from an experimentally determined data set by means of multiple linear regression.

In order to estimate the thermal resistance of the at least one semiconductor element, as a function of the light distribution to be generated, it is possible to analyze a light pattern corresponding to the control of the semiconductor elements when generating the light distribution, in particular by using pulse width modulation to control the semiconductor elements.

It may be provided that a first of the parameters corresponds to the average of the bit values or the PWM values of the light pattern of the light distribution to be generated. Alternatively or additionally, it may be provided that a second of the parameters corresponds to the highest average value of the bit values or PWM values of an area of the light pattern of the light distribution to be generated, in particular a range between 5×5 pixels and 20×20 pixels, preferably an area of 10×10 pixels. Further alternatively or additionally, it may be provided that a third of the parameters corresponds to the number of pixels whose bit values or PWM values are equal to 0. All these parameters allow for a comparatively reliable prediction of the change in thermal resistance due to a change in the light pattern or a transition from a first to a second light distribution.

The lighting apparatus can be designed to carry out the method according to the invention. Transitions between light distributions where the method can ensure the operation of the semiconductor elements within their specifications are, for example, the transition from a low beam to a high beam, or the elimination of a blanked out area in the light distribution, or the enhancement of the illumination of the vehicle's own lane.

It may be provided that the semiconductor elements are formed as light emitting diodes or as laser diodes, in particular wherein the semiconductor elements are part of a solid state LED array. For example, the light source may have 16,000 or more semiconductor elements.

It is possible that the lighting apparatus includes at least one temperature sensor located on or in the light source and/or that the lighting apparatus includes a control unit for controlling the semiconductor elements, which is configured to calculate the parameters when the lighting apparatus is operating.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the sole FIGURE shows a schematic representation of the sequence of the inventive method.

DETAILED DESCRIPTION

The example describes a method for a lighting apparatus designed as a headlamp which comprises a solid-state LED array or an SSL HD LED as the light source. In particular, this light source can comprise 16,000 or more semiconductor elements. The lighting apparatus also includes at least one temperature sensor located on or in the light source, in particular in the area of the junction of at least one of the semiconductor elements. The lighting apparatus also includes a control unit for controlling the semiconductor elements.

The lighting apparatus is also configured to control the semiconductor elements so as to produce different light distributions, in particular a first and a second light distribution, wherein the light distributions are produced in succession. Transitions between the light distributions can be, for example, the transition from a low beam to a high beam or the elimination of a blanked out area in the light distribution or the intensification of the illumination of the vehicle's own lane.

The method shown schematically in the FIGURE assumes a state in which the semiconductor elements are controlled so that a first light distribution is generated. The control of the semiconductor elements to generate the first light distribution corresponds to a first light pattern. Pulse width modulation can be used to control the semiconductor elements. Based on the state in which the first light distribution is generated, the aim is to estimate how the temperature of the light source changes when changing from the first to a second light distribution.

To calculate the temperature change in the transition from the first to the second light distribution, an algorithm is used to calculate a temperature difference between the solder joint and the junction region of at least one semiconductor element. The calculation of the temperature difference is carried out by estimating the thermal resistance of the at least one semiconductor element as a function of the light distribution to be generated. The thermal resistance is given by a formula of the type:

$$R_{th} = c_1 \cdot p_1 + c_2 \cdot p_2 + c_3 \cdot p_3 \ldots + b$$

wherein $c_1$, $c_2$, $c_3$, . . . and b are experimentally determined coefficients and wherein $p_1$, $p_2$, $p_3$, . . . are parameters that are calculated when the first light distribution is generated in the control unit of the lighting apparatus.

The coefficients are determined from an experimentally determined data set by means of multiple linear regression. For example, the solder joint temperature and the junction temperature may be measured for different light patterns before the light source is installed in the lighting apparatus.

A first parameter $p_1$ corresponds to the average of the bit values or the PWM values of the light pattern of the light distribution to be generated. A second parameter $p_2$ corresponds to the highest average value of the bit values or PWM values of an area of 10×10 pixels of the light pattern of the light distribution to be generated. A third parameter $p_3$ corresponds to the number of pixels whose bit values or PWM values are equal to 0.

It may well be provided to use more or different parameters for estimating the thermal resistance of the at least one semiconductor element as a function of the light distribution to be generated.

A second light pattern corresponds to the control of the semiconductor elements for generating the second light distribution, which is the starting point in a first step 1 of the schematically presented method. This light pattern is analyzed in a second step 2 of the method in order to calculate the parameters $p_1$, $p_2$, $p_3$, . . . for this second light pattern.

In a further step 3, the coefficients $c_1$, $c_2$, $c_3$, . . . and b corresponding to the parameters $p_1$, $p_2$, $p_3$, . . . for this second light pattern are read out, so that in a further step 4 the thermal resistance, and therefrom the temperature difference $\Delta T_2$, can be calculated for the second light pattern on the basis of the parameters and the coefficients.

The calculated temperature difference $\Delta T_2$ is stored in a further step 5. In a further step 6, the previously calculated temperature difference $\Delta T_1$ is read out for the first light pattern, wherein in a subsequent step 7 the temperature change in the transition from the first to the second light pattern or in the transition from the first to the second light distribution is calculated by subtracting the first temperature difference $\Delta T_1$ from the second temperature difference $\Delta T_2$.

In a further step 8, the current temperature of the light source is determined by reading out the at least one temperature sensor. In a further step 9, the calculated temperature change and the current temperature are used to calculate the temperature to be expected after the transition from the first to the second light pattern or after the transition from the first to the second light distribution. In a next step 10, the expected temperature is compared with the threshold value of the temperature, which is, for example, 150° C.

If the expected temperature is equal to or below the threshold value, the next step 11 is to decide that there is no need to change the control corresponding to the second light pattern. The semiconductor elements are controlled accordingly in step 12.

If the expected temperature is above the threshold value, the next step 13 is to calculate what power is permissible for the semiconductor elements without the temperature exceeding the threshold value. In a subsequent step 14, the power for the control is limited to the permissible value for the second light pattern, so that the semiconductor elements are controlled accordingly in step 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a lighting apparatus of a motor vehicle, the lighting apparatus comprising a light source with semiconductor elements arranged in a matrix for a targeted generation of pixels of a light distribution and the lighting apparatus being configured to control the semiconductor elements so that at least one first light distribution and one second light distribution are generated in succession, the method comprising:
   recording a temperature of the light source while the first light distribution is generated;
   calculating a temperature change of the light source that is expected to emerge during a transition from the first light distribution to the second light distribution; and
   when the calculation predicts that the transition from the first light distribution to the second light distribution will give rise to an excessive temperature leading to a temperature above a specified threshold value in at least one critical region of the light source, reducing the power of at least one of the semiconductor elements during the control of the semiconductor elements implemented to generate the second light distribution, such that the temperature in the at least one critical region of the light source is not expected to exceed the specified threshold value as a result of the transition from the first light distribution to the second light distribution,
   wherein, for calculating the temperature change at the transition from the first light distribution to the second light distribution, an algorithm is used which calculates a temperature difference between a solder joint and a junction region of the at least one of the semiconductor elements.

2. The method according to claim 1, wherein the at least one critical region whose temperature should not rise above the specified threshold value is the junction region of the at least one of the semiconductor elements.

3. The method according to claim 2, wherein the recorded temperature of the light source is a temperature at or in the junction region of the at least one of the semiconductor elements.

4. The method according to claim 1, wherein the specified threshold value of the temperature in the at least one critical region of the light source is between 140° C. and 160° C.

5. The method according to claim 1, wherein the calculation of the temperature difference is carried out by estimating a thermal resistance $R_{th}$ of the at least one of the semiconductor elements as a function of the light distribution to be generated.

6. The method according to claim 5, wherein the thermal resistance $R_{th}$ is calculated by a formula:

$$R_{th} = c_1 \cdot p_1 + c_2 \cdot p_2 + c_3 \cdot p_3 \ldots + b$$

wherein $c_1, c_2, c_3, \ldots$ and b are experimentally determined coefficients and wherein $p_1, p_2, p_3, \ldots$ are parameters which are calculated when the lighting apparatus is operated or when the first light distribution is generated.

7. The method according to claim 6, wherein the coefficients are determined from an experimentally determined data set via a multiple linear regression.

8. The method according to claim 5, wherein, for the estimation of the thermal resistance of the at least one of the semiconductor elements, as a function of the light distribution to be generated, a light pattern corresponding to the control of the semiconductor elements during generation of the light distribution is analyzed, or wherein pulse width modulation is used to control the semiconductor elements.

9. The method according to claim 8, wherein one of the first of the parameters corresponds to the average of the bit values or the PWM values of the light pattern of the light distribution to be generated.

10. The method according to claim 8, wherein a second of the parameters corresponds to the highest average value of the bit values or PWM values of an area of the light pattern of the light distribution to be generated, in a range between 5×5 pixels and 20×20 pixels.

11. The method according to claim 8, wherein a third of the parameters corresponds to the number of pixels whose bit values or whose PWM values are equal to 0.

12. A lighting apparatus for a motor vehicle, the lighting apparatus comprising:
   a light source with semiconductor elements arranged in a matrix for a targeted generation of pixels of a light distribution, the lighting apparatus being configured to control the semiconductor elements so that at least one first light distribution and one second light distribution are produced in succession,
   wherein the lighting apparatus is adapted to perform the method according to claim 1.

13. The lighting apparatus according to claim 12, wherein the semiconductor elements are formed as light emitting diodes or as laser diodes, or wherein the semiconductor elements are part of a solid-state LED array.

14. The lighting apparatus according to claim 12, wherein the lighting apparatus comprises at least one temperature sensor located on or in the light source and/or wherein the lighting apparatus comprises a control unit for controlling the semiconductor elements, which is configured to calculate the parameters when the lighting apparatus is operated.

15. The method according to claim 1, wherein the lighting apparatus is a high-resolution headlamp of the motor vehicle.

16. The method according to claim 4, wherein the specified threshold value is between 145° C. and 155° C.

17. The method according to claim 10, wherein the range is 10×10 pixels.

18. The lighting apparatus according to claim 12, wherein the lighting apparatus is a high-resolution headlamp of the motor vehicle.

\* \* \* \* \*